(12) United States Patent
Sjölén (10) Patent No.: US 10,996,143 B2
(45) Date of Patent: May 4, 2021

(54) DEVICE FOR SURFACE SAMPLING WITH REMOVAL DEVICE

(71) Applicant: Expertus Kemiteknik AB, Sundsvall (SE)

(72) Inventor: Lennart Sjölén, Sundsvall (SE)

(73) Assignee: EXPERTUS KEMITEKNIK AB, Sundsvall (SE)

(*) Notice: Subject to any disclaimer, the term of this patent is extended or adjusted under 35 U.S.C. 154(b) by 99 days.

(21) Appl. No.: 16/231,422

(22) Filed: Dec. 22, 2018

(65) Prior Publication Data

US 2019/0195744 A1 Jun. 27, 2019

Related U.S. Application Data

(63) Continuation of application No. PCT/SE2017/050734, filed on Jun. 30, 2017.

(51) Int. Cl.
*G01N 1/02* (2006.01)
*B32B 7/06* (2019.01)
(Continued)

(52) U.S. Cl.
CPC ............... *G01N 1/02* (2013.01); *B32B 3/02* (2013.01); *B32B 3/26* (2013.01); *B32B 5/18* (2013.01);
(Continued)

(58) Field of Classification Search
CPC .... G01N 1/02; B32B 7/12; B32B 7/02; B32B 7/06; B32B 3/02
See application file for complete search history.

(56) References Cited

U.S. PATENT DOCUMENTS 2,969,057 A * 1/1961 Simmons ................. G01N 1/02
600/572
D342,321 S 12/1993 Bresle
(Continued)

FOREIGN PATENT DOCUMENTS

KR 20090130750 A 12/2009
WO 2005097021 A1 10/2005
(Continued)

OTHER PUBLICATIONS

Elcometer Limited, Elcometer 135B Bresle Patches, datasheet 1-22 V2, Mar. 18, 2015; whole document.
(Continued)

*Primary Examiner* — Helen C Kwok
(74) *Attorney, Agent, or Firm* — Gabriela B. Tomescu, Esq.; Bergenstråhle & Partners AB (57) ABSTRACT

Device (1) for surface sampling, comprising: a material layer (2) comprising a surface portion (2c) and a circumferential edge portion (2d) defining the boundary of the surface portion (2c), further comprising a sampling volume (2a), wherein the sampling volume (2a) is adapted to comprise a filler device (2b) for filling out the sampling volume (2a), a protective layer (3) arranged on the surface portion (2c) of the material layer (2) by an adhesive (4) arranged on the surface portion (2c) of the material layer (2), wherein the device (1) further comprises a removal device (12), wherein the removal device (12) is fixedly arranged to the material layer (2), wherein the removal device (12) further comprising a removal surface portion (12a), wherein the removal surface portion (12a) is adapted to provide a lower adhesion against a surface compared to the adhesive (4), wherein the removal surface portion (12a) is facing essentially the same direction as the surface portion (2c).

14 Claims, 6 Drawing Sheets

(51) Int. Cl.
  *B32B 7/12* (2006.01)
  *B32B 3/02* (2006.01)
  *B32B 3/26* (2006.01)
  *B65D 65/22* (2006.01)
  *B32B 25/04* (2006.01)
  *B32B 7/02* (2019.01)
  *B32B 5/32* (2006.01)
  *B32B 27/06* (2006.01)
  *B32B 29/00* (2006.01)
  *B32B 5/22* (2006.01)
  *B32B 5/18* (2006.01)
  *G01N 1/40* (2006.01)

(52) U.S. Cl.
  CPC .................. *B32B 5/22* (2013.01); *B32B 5/32* (2013.01); *B32B 7/02* (2013.01); *B32B 7/06* (2013.01); *B32B 7/12* (2013.01); *B32B 25/04* (2013.01); *B32B 25/045* (2013.01); *B32B 27/065* (2013.01); *B32B 29/007* (2013.01); *B65D 65/22* (2013.01); *B32B 2266/025* (2013.01); *B32B 2266/08* (2013.01); *B32B 2307/54* (2013.01); *B32B 2307/546* (2013.01); *B32B 2307/732* (2013.01); *B32B 2307/748* (2013.01); *G01N 1/40* (2013.01); *G01N 2001/028* (2013.01)

(56) References Cited

U.S. PATENT DOCUMENTS

| | | | | |
|---|---|---|---|---|
| 5,910,450 | A | * | 6/1999 | Manns .................. G01N 1/405 |
| | | | | 205/778.5 |
| 6,425,997 | B1 | * | 7/2002 | Johnson .................. C25F 1/00 |
| | | | | 205/705 |
| 2002/0035869 | A1 | * | 3/2002 | Schroder ................ G01N 21/94 |
| | | | | 73/432.1 |
| 2005/0008536 | A1 | * | 1/2005 | Wilson .................... B01L 3/505 |
| | | | | 422/400 |
| 2017/0074754 | A1 | * | 3/2017 | Sjolen ...................... G01N 1/02 |
| 2017/0315038 | A1 | * | 11/2017 | Kim .................. G01N 15/0205 |

FOREIGN PATENT DOCUMENTS

| WO | 2006038023 A1 | 4/2006 |
|---|---|---|
| WO | 2015147729 A1 | 10/2015 |
| WO | 2016064067 A1 | 4/2016 |

OTHER PUBLICATIONS

International Standard ISO 8502-6:2006(E), "Preparation of steel substrates before application of paints and related products—Tests for the assessment of surface cleanliness. Part 6: Extraction of soluble contaminants for analysis—The Bresle method", Second Edition, Jul. 1, 2006; figures 1-6.

* cited by examiner

DEVICE FOR SURFACE SAMPLING WITH REMOVAL DEVICE

This application is the continuation of International Application No. PCT/SE2017/050734, filed 30 Jun. 2017, which claims the benefit of Swedish Patent Application No. SE 1650968-9, filed 1 Jul. 2016, the entire contents of which are hereby incorporated by reference.

TECHNICAL FIELD

The present invention relates generally to devices for surface sampling.

BACKGROUND ART

It is known to use adhesive patches for surface sampling comprising a protective sheet to be removed prior to attaching the patch to a surface. Prior art document WO2015/147729 A1 by the applicant describes a device for surface sampling wherein a protective layer extends beyond the boundary of a surface portion of the device for facilitating a removal of the protective layer from the device.

Certain requirements have to be met according to a test described in the relevant ISO-Standard in this technical field in terms of withstanding the increased pressure resulting from filling the sampling compartment without leakage occurring which e.g. could result in an incorrect analysis result. In order to comply with such requirements whereby the device is firmly fixed onto a test surface and a seal against leakage of washing/extracting liquid is prevented, a sufficient adhesion between the device and a test surface is necessary. As a result, since adhesion and adhesive forces between the device and surface is often stronger than cohesion of the material of the device, difficulties arise after use of the same, when the device is to be removed from the surface. A well-known drawback with the known art is thus that residues of the device is often left on the surface and is thereafter difficult to remove. The devices are therefore generally removed within a short time after carrying out a test/sampling to reduce the effect of an increased adhesion between the test surface and the device over time. Often, only one or a few devices are used at the same time for this reason, which reduces the overall efficiency as well as the ability to sufficiently document the tests, e.g by taking photographs and documenting the exact locations of the test surfaces/locations as well as the time the adhesive patches have been attached to a surface. Using, on the other hand, both a strong adhesive and a strong material with high cohesion will give a device that is very difficult to remove from a surface. Usually, the removal of residues requires the use of a knife or scrape followed by application of a solvent or an extra sand blasting procedure. In many instances, however, the use of solvent or blasting procedures are not possible or wanted as they cause damage to certain sensitive surfaces, creates a hazardous working environment or necessitates cleaning afterwards. This is further a time consuming procedure often carried out in industrial environments for example in the ship building industry, wherein the surfaces to be analyzed are difficult and dangerous to reach, for instance vertical ship sides or walls or roofs in ballast tanks or standing on unsafe scaffolds or ladders with falling risks present. To reduce the risk an operator needs to have focus on the work position being secured in a manner preventing a fall, for instance by holding on suitable objects. Further, the work related to surface sampling may be made in areas of very limited lighting conditions. Any additional, unwanted time and extra focus required to remove remains of an adhesive patch increases the exposure to this risk.

SUMMARY OF INVENTION

An object of the present invention is to create a device for surface sampling which is easier, less time-consuming and therefore both more economic and safer to use. A further object of the present invention is to provide a device for surface sampling which is more versatile and enables the use of stronger adhesives.

According to one embodiment, a device for surface sampling is provided, comprising: a material layer comprising a surface portion and a circumferential edge portion defining the boundary of the surface portion, further comprising a sampling volume, wherein the sampling volume is adapted to comprise a filler device for filling out the sampling volume, a protective layer arranged on the surface portion of the material layer by an adhesive arranged on the surface portion of the material layer, wherein the device further comprises a removal device, wherein the removal device is fixedly arranged to the material layer, wherein the removal device further comprising a removal surface portion, wherein the removal surface portion is adapted to provide a lower adhesion against a surface compared to the adhesive, wherein the removal surface portion is facing essentially the same direction as the surface portion.

According to one embodiment, the removal device is integrated with the material layer.

According to one embodiment, the removal device comprises at least a portion of a layer 13 arranged intermediate the adhesive and the material layer, wherein the layer 13 is arranged to the material layer by a second adhesive layer.

According to one embodiment, the removal device comprises at least a portion of a layer 14 arranged intermediate the material layer and a further film layer, wherein the layer 14 is arranged to the material layer by a third adhesive layer.

According to one embodiment, the removal device comprises at least a portion of the respective layers 13 and 14.

According to one embodiment, the material layer comprises a plurality of separate layers.

According to one embodiment, the removal device is integrated with at least one of the layers.

According to one embodiment, the material layer is a foam layer.

According to one embodiment, the separate layers are separate foam layers.

According to one embodiment, the removal device is arranged between two separate layers of the material layer.

According to one embodiment, a protective sheet layer is arranged on the removal surface portion covering a portion of the adhesive on the surface portion.

According to one embodiment, the removal device comprises a further removal surface portion, wherein the further removal surface portion is facing an opposite direction in relation to the surface portion.

According to one embodiment, the removal device extends beyond the boundary of the surface portion.

According to one embodiment, the removal device comprises a bulge of the surface portion.

According to one embodiment, a portion of the protective layer extends beyond the boundary of the surface portion for facilitating a removal of the protective layer from the material layer.

According to one embodiment, a portion of the protective layer extends beyond the boundary of the surface portion for facilitating a removal of the protective layer from the material layer, and wherein the removal device extends in a direction parallel to the portion.

According to one embodiment, the removal device is covered by the portion of the protective layer, wherein the portion extends further than the removal device.

According to one embodiment, a portion of the protective layer extends beyond the boundary of the surface portion for facilitating a removal of the protective layer from the material layer, and wherein the removal device extends in a direction perpendicular to the portion.

According to one embodiment, the material layer is flat.

According to one embodiment, the device is configured to be attached to a surface by removal of the protective layer to expose the adhesive layer prior to attachment.

According to one embodiment, the device is configured to receive washing/extraction liquid in the sampling volume during attachment to the surface.

According to one embodiment, a device for surface sampling is provided, comprising:
a material layer comprising a surface portion and a circumferential edge portion defining the boundary of the surface portion, further comprising a sampling volume, wherein the sampling volume is adapted to comprise a filler device for filling out the sampling volume,
a protective layer arranged on the surface portion of the material layer by an adhesive arranged on the surface portion of the material layer,
wherein the device is configured to be attached to a surface by removal of the protective layer to expose the adhesive layer prior to attachment, wherein the device is further configured to receive washing/extraction liquid in the sampling volume during attachment to the surface,
characterized in that the device further comprises a removal device, wherein the removal device is fixedly arranged to the material layer, wherein the removal device further comprising a removal surface portion, wherein the removal surface portion is adapted to provide a lower adhesion against a surface compared to the adhesive, wherein the removal surface portion is facing essentially the same direction as the surface portion.

BRIEF DESCRIPTION OF DRAWINGS

The invention is now described, by way of example, with reference to the accompanying drawings, in which.

DESCRIPTION OF EMBODIMENTS

Figure 1:
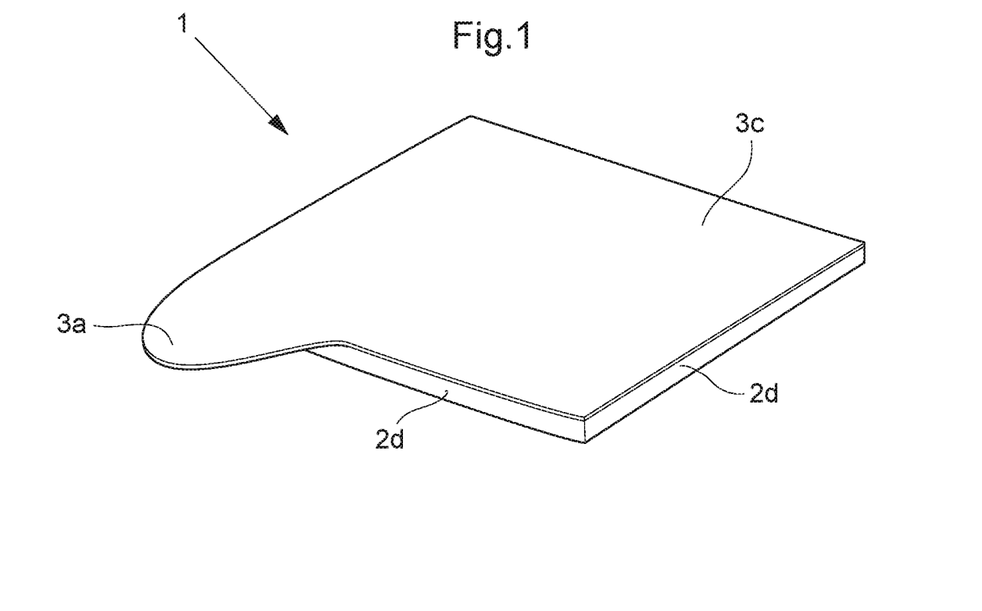
FIGS. 1-1' shows a perspective view of a device for surface sampling according to invention prior art device for surface sampling.

In the following, a detailed description of the invention will be given. In the drawing figures, like reference numerals designate identical or corresponding elements throughout the several figures. It will be appreciated that these figures are for illustration only and are not in any way restricting the scope of the invention. According to one embodiment, flat or planar should be understood as something essentially extending in two dimensions. This should not be understood as not having any extension in the third dimension. FIG. 1-1' discloses the prior art as is defined in WO2015/147729 A1 by the applicant. WO2015/147729A1 is hereby incorporated by reference in its entirety. Protection may be sought for features in the referenced document. As is also described herein, planar or flat is defined as wherein a thickness or height dimension of the device 1 is less than any of the extensions of the device 1, perpendicular to the thickness or height direction, defining the surface area of the device 1. According to one embodiment, the use of underside and upper side throughout the text are used for explanatory purposes only. The use of the device 1 enables it to be attached to surfaces having arbitrary normal directions in the three-dimensional space, wherein these surfaces or normal direction of these surfaces may basically have any direction.

FIGS. 1-1' shows a perspective view of a device 1 for surface sampling, i.e. whereby a surface can be tested by the aid of chemical analysis, for instance by checking for existing contaminants, substances or particles in the test surface area. FIG. 1 shows the device 1 in a closed state prior to usage and FIG. 1' shows the interior of the device 1.

The device 1 for surface sampling comprises a flat or planar material layer 2 comprising a surface portion 2c and a circumferential edge portion 2d encompassing the surface portion 2c and thus defining a boundary of the surface portion 2c. According to one embodiment, the material layer 2 comprises a foam material. According to one embodiment, the material layer is made of ageing—resistant, flexible material with closed pores, e.g. polyethylene foam. According to one embodiment, the foam material is a double-stick foam material. According to one embodiment, adhesive is arranged on the underside and on the upper side of the material layer 2, wherein a protective sheet 8 is present on the underside and removed to be replaced by a latex sheet 9 or thin elastomer film 9, in a manufacturing step, hereinafter referred to as a film layer 9. According to one embodiment, the flat material layer 2 comprises several layers of double-stick foam are arranged onto each other. According to one embodiment, the flat material layer 2 has a depth of between 0.5-5 mm. According to one embodiment, the device 1 may have a square shape. According to one embodiment, the device 1 may have a rectangular shape. According to another embodiment, the device 1 may have a circular shape. The device 1 may thus have various forms, shapes and dimensions. According to one embodiment, the dimensions/size of the device 1 is a 5×5 cm shaped square. According to one embodiment, the material layer 2 has a thickness of 0.5-5 mm.

The device 1 for surface sampling further comprises a sampling volume 2a. According to one embodiment, the sampling volume 2a is adapted to comprise a filler device 2b, which essentially fills out the sampling volume 2a prior to use and forms a reinforcement until the device is used. Before use of the device 1, the filler device 2b may be removed from the sampling volume 2a, thus creating a recess in the surface portion 2c. According to one embodiment, the filler device 2b is a cut-out of the material 2. According to one embodiment, the cut-out of the material is created during manufacturing of the device 1 in a punching process step. According to one embodiment, the filler device 2b is a separate material compared to the material layer 2. According to one embodiment, the filler device has a round or circular shape. According to one embodiment, the corresponding sampling area of the sampling volume 2a is 12.5 cm². According to one embodiment, the sampling volume has a depth of 1-2 mm. According to one embodiment, the filler device 2b may have various forms, shapes and dimensions to fit various needs. The filler device 2b may for instance be square circular, rectangular, elliptical etc.

The device 1 for surface sampling further comprises a protective layer 3 arranged on the surface portion 2c of the material layer 2 by an adhesive 4 arranged on the material layer 2. According to one embodiment, the adhesive 4 is an adhesive layer covering the surface portion 2c. According to one embodiment, the protective layer 3 is a thin sheet of paper. According to one embodiment, the protective layer 3 is treated, at least on one side preferably the underside 3b, with silicon or other suitable substances or material to more easily be detachable from the adhesive and the material layer 2. According to one embodiment, the protective layer 3 is a siliconized sheet of paper. According to further embodiments, the protective layer 3 is made of a synthetic material or a synthetic paper.

According to one embodiment of the device 1, for surface sampling, as shown in FIGS. 1-1', a portion 3a of the protective layer 3 extends beyond the boundary of the surface portion 2c for facilitating a removal of the protective layer 3 from the material layer 2. A person aiming to remove the protection layer may more easily grasp the portion 3a extending beyond the surface portion 2a and pull off the protective layer 3 from the material layer 2. According to one embodiment, the shape of the portion 3a may be rounded as in FIG. 1 or have other geometrical shapes, and extend beyond the boundary of the surface portion 2c to a varying extent. According to one embodiment, the portion 3a extends by 1%-50% of the total length or diameter of the device 1, beyond the boundary of the surface portion 2c, in the same or a parallel direction as the extension of the portion 3a. According to one embodiment, the portion 3a extends by 0.5-25 mm beyond the boundary of the surface portion 2c. According to one embodiment, the largest extension of the portion 3a in a direction opposite to the extension beyond the boundary is between 10%-100% of the length of the device 1 in a direction parallel to the extension in this direction. According to one embodiment, a certain portion of the protective layer 3 directly above the filler device 2b may not be siliconized or treated by any other means to more easily detach from the adhesive. Therefore when a user pulls the portion 3a the protective layer 3 will be removed to expose the adhesive 4 prior to attaching the device 1 for sampling, and at the same time remove the filler device 2b from the sampling volume 2a which will thus stick to the protective layer 3. Thus, no direct contact of a human to the filler or sampling volume 2a is needed during removal for the filler device 2b which reduces the risk of contaminating the sampling volume 2a.

Figure 2A:
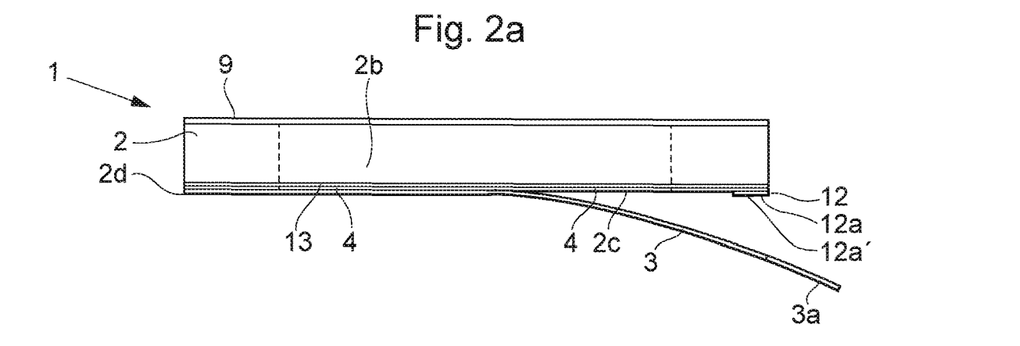
FIGS. 2a-2g shows a side views of a device for surface sampling according to various embodiments of the invention.

FIG. 2a discloses a side view of a device for surface sampling arranged on a surface 15, comprising a flat material layer 2 comprising a surface portion 2c and a circumferential edge portion 2d defining the boundary of the surface portion 2c, further comprising a sampling volume 2a, wherein the sampling volume 2a is adapted to comprise a filler device 2b for filling out the sampling volume 2a. A protective layer 3 is arranged on the surface portion 2c of the material layer 2 by an adhesive 4 arranged on the surface portion 2c of the material layer 2, wherein the device 1 further comprises a removal device 12, wherein the removal device 12 is rigidly arranged to the material layer 2, wherein the removal device 12 further comprising a removal surface portion 12a, wherein the removal surface portion 12a is adapted to provide a lower adhesion against a surface 15 compared to the adhesive 4, wherein the removal surface portion 12a is facing essentially the same direction as the surface portion 2c. According to one embodiment, the removal surface portion 12a is facing the same direction as the surface portion 2c. According to one embodiment, by essentially facing the same direction, the removal surface portion 12a would abut or bear against the surface 15 during a test or surface sampling procedure using the device 1. According to one embodiment, this reflects the removal surface portion 12a as described throughout the description. According to one embodiment, FIGS. 2a-2g, discloses a slightly bent removal portion 12 in relation to the rest of device 1, which bending primarily aims to facilitate for the reader the identification of the respective removal portions 12 and what they comprise. According to one embodiment, a slightly bent removal portion 12 is still considered to comprise a removal surface portion 12a essentially facing the same direction as the surface portion 2c. According to one embodiment, that the removal surface portion 12a is facing essentially the same direction as the surface portion 2c provides that the normal direction of the removal surface portion 12a within 45° from the normal direction of the surface portion 2c. According to one embodiment, that the removal surface portion 12a is facing essentially the same direction as the surface portion 2c provides that the normal direction of the removal surface portion 12a within 20° from the normal direction of the surface portion 2c.

According to one embodiment, being rigidly arranged to the material layer 2 provides that they, e.g. the removal device 12 and the material layer 2 may both be composed of the same material, or composed of separate materials rigidly or fixedly attached to each other. According to one embodiment, being composed of the same material provides that they are integrated. According to one embodiment, rigidly arranging the removal device 12 to the material layer provides that normal pulling of the removal device in normal conditions, i.e. in a common test situation, will not cause separation of the same or residues of the material layer on the test surface. According to one embodiment, rigidly arranging corresponds to fixedly arranging, or rigidly fixing two portions to each other, i.e. wherein two portions such as the removal portion and the material layer are fixedly held together and are adapted to be held together during normal use and removal of the device 1. According to one embodiment, rigidly or fixedly arranging the removal device 12 to the material layer 2 means that they are adapted to be held together during normal use sufficiently to avoid leakage e.g. between the material layer 2 and the removal device 12 of e.g. washing/extracting liquid injected in the sampling volume. According to one embodiment, the material layer 2 and the removal device 12 have similar cohesion properties. According to one embodiment, the removal device 12 has higher cohesion properties than the material layer 2. According to one embodiment, described herein, the removal surface portion 12a is a surface portion wherein less or no adhesive 4 is arranged on the material layer 2. According to one embodiment, the removal surface portion 12a is provided with a protective sheet layer 12a' covering a portion of the adhesive 4 on the surface portion 2c. According to such embodiment, the removal device 12 is integrated with the material layer 2. This enables a user to get a better grip as well as an advantageous pulling angle of the device 1 in relation to the surface during removal of the same from the surface, wherein removal of the device is facilitated. According to one embodiment, a portion 3a of the protective layer 3 is provided that extends beyond the boundary of the surface portion 2c for facilitating removal of the protective layer 3 from the material layer 2. According to one embodiment, a layer 13 as will be further described below, is arranged intermediate the material layer 2 and the adhesive 4. According to one embodiment, the layer 13 is arranged intermediate the adhesive 4 and a second adhesive layer 4' as described below.

Figure 2B:
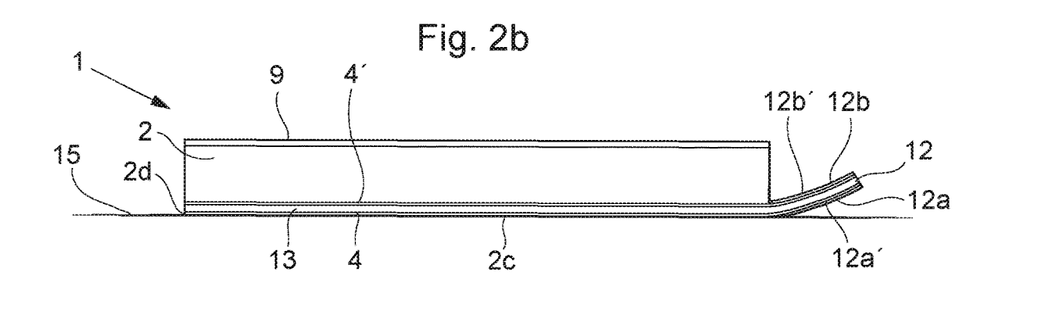

FIG. 2b discloses a side view of one embodiment of a device for surface sampling arranged on a surface 15, according to the invention, wherein the removal device 12 and removal surface portion 12a comprises at least a portion of layer 13 arranged intermediate the adhesive 4 and the material layer 2, wherein the layer 13 is arranged to the material layer 2 by a second adhesive layer 4'. According to one embodiment the adhesive layer 4' provides that the layer 13 is rigidly arranged to the material layer 2. According to one embodiment, the removal portion 12 comprises a further removal surface portion 12b adapted to provide a lower adhesion against a surface, such as e.g. a human hand or finger, compared to the adhesive 4, or 4'. According to one embodiment the further removal surface portion 12b is facing an opposite direction in relation to the removal surface portion 12a and surface portion 2c. According to one embodiment, the removal surface portion 12a is provided with a protective sheet layer 12a' covering a portion of the adhesive 4 on the surface portion 2c. According to one embodiment, the further removal surface portion 12b is provided with a further protective sheet layer 12b' covering a portion of the adhesive 4' between the layer 13 and the material layer 2. Thus, according to one embodiment, the removal device 12 is rigidly arranged to the material layer 2 wherein the removal device further comprises a removal surface portion 12a and a removal surface portion 12a is adapted to provide a lower adhesion against a surface 15 compared to the adhesive 4 wherein the removal surface portion 12a is facing essentially the same direction as the surface portion 2c.

Figure 2C:
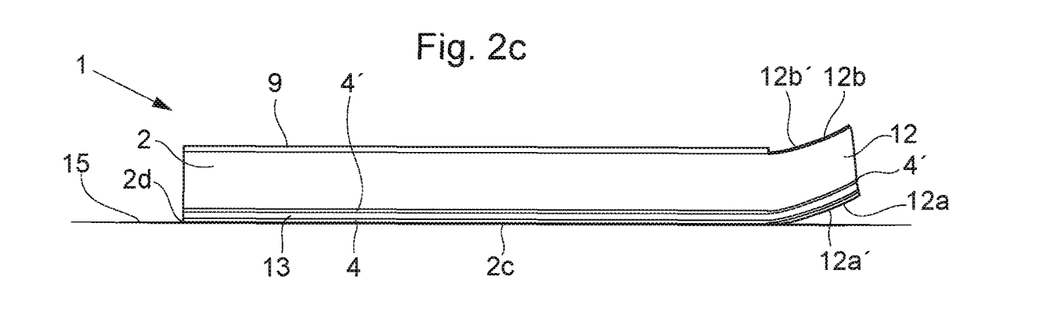

FIG. 2c discloses a side view of one embodiment of the present invention, arranged on a surface 15 wherein the removal device 12 comprises the material layer 2. According to one embodiment, the removal device 12 is integrated with the material layer 2. According to one embodiment, the removal device 12 is integrated with the material layer 2 and the portion of a layer 13 arranged intermediate the adhesive layer 4 and the material layer 2, wherein the layer 13 is arranged to the material layer 2 by a second adhesive layer 4'. According to one embodiment, as described in connection with FIG. 2b, the removal device 12 comprises a removal surface portion 12a and a removal surface portion 12b.

Figure 2D:
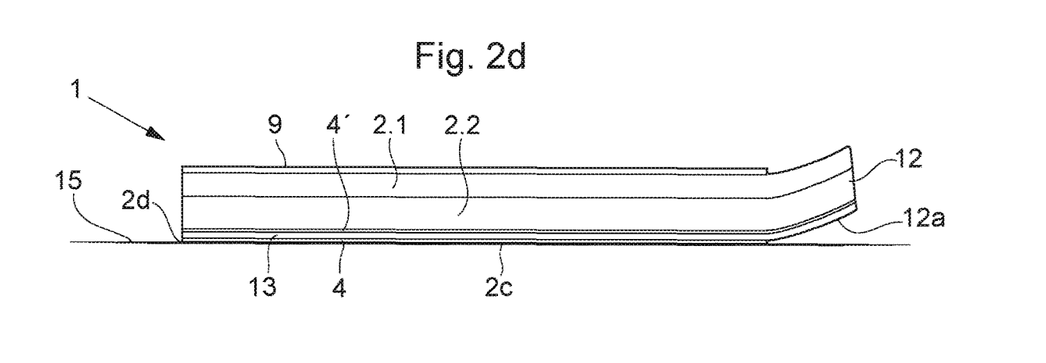

FIG. 2d discloses a side view of one embodiment of the present invention, arranged on a surface 15, wherein the material layer 2 comprises a plurality of separate layers 2.1, 2.2, in this case two separate layers 2.1, 2.2. The removal device 12 is integrated with the two layers 2.1, 2.2 of the material layer 2. According to one embodiment, as disclosed in FIG. 2d, the removal device 12 comprises a removal surface portion 12a is a non-adhesive or lower adhesive portion, adapted to provide a lower adhesion against a surface compared to the adhesive 4, wherein the removal surface portion 12a is facing essentially the same direction as the surface portion 2c, i.e. a direction that essentially would face the surface 15 or abut the surface 15 when surface sampling test is carried out.

Figure 2E:
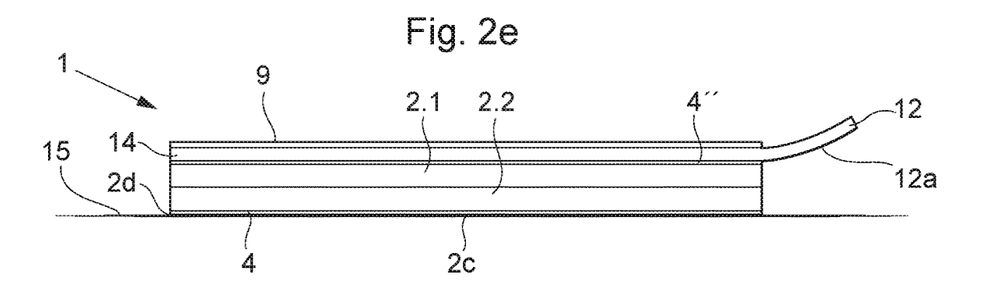

FIG. 2e discloses a side view of one embodiment of the present invention, arranged on a surface 15, wherein the removal device 12 comprises at least a portion of a layer 14 arranged intermediate the material layer 2 and a further film layer 9, wherein the layer 14 is arranged to the material layer 2 by a third adhesive layer 4". According to one embodiment, disclosed herein, the material layer comprises a plurality of separate layers 2.1, 2.2, in this case two separate layers 2.1, 2.2. The removal device 12 is integrated with the two layers 2.1, 2.2 of the material layer 2.

Figure 2F:
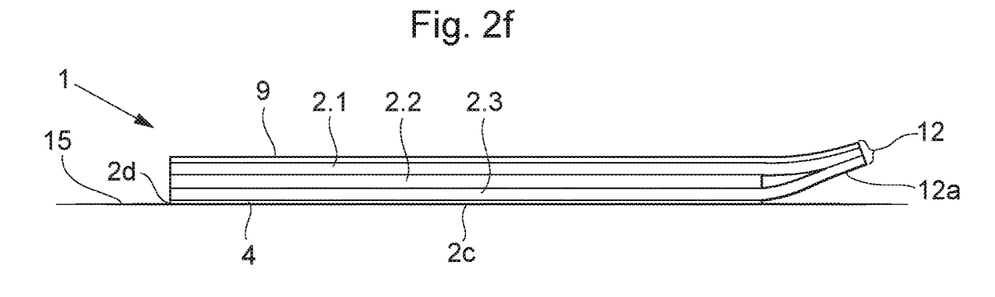

FIG. 2f discloses a side view of one embodiment of the present invention, arranged on a surface 15, wherein the removal device is integrated with at least one of the layers 2.1, 2.2, 2.3, i.e. in this case, two layers 2.1 and 2.3 wherein one layer 2.2 is arranged there between. According to one embodiment, the respective layers 2.1 and 2.2 is replaced by the layers 14 and 13 respectively. Thus, according to one embodiment, the removal device 12 comprises at least a portion of the respective layers 13 and 14. According to one embodiment, as described herein, the film layer 9 is shaped and adapted to cover and being arranged to the removal device 12, by extending over and covering the further removal portion 12b and being arranged to the same. According to one embodiment, the removal device 12 thereby becomes more rigid.

Figure 2G:
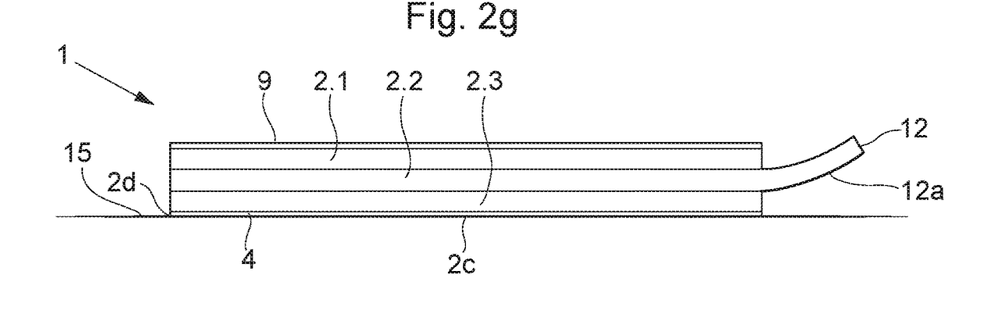

FIG. 2g discloses a side view of one embodiment of the present invention, arranged on a surface 15, wherein the removal device is integrated with at least one of the layers 2.1, 2.2, 2.3. According to one embodiment, this layer comprises layer 2.2, arranged intermediate the layers 2.1 and 2.3. According to one embodiment, the layer 2.2 is replaced by a similar layer as 13 or 14, thus not forming part of the material layer 2.

Figure 3:
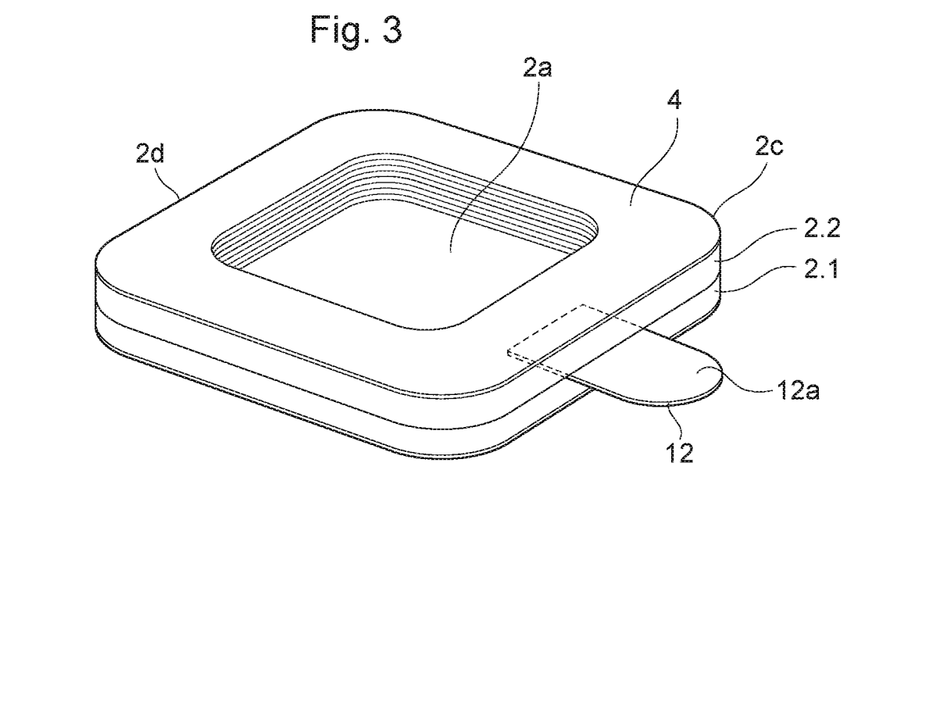
FIG. 3 shows a perspective view of a device for surface sampling according to one embodiment.

FIG. 3, discloses a perspective view of the present invention according to one embodiment. Herein, the protective layer 3 has been removed. Herein, a removal device 12 is rigidly arranged to the material layer 2 by being arranged between two layers 2.1 and 2.2 of the material layer 2. According to one embodiment, an adhesive layer is arranged between layers 2.1, 2.2. According to one embodiment, a first adhesive layer is arranged on the layer 2.1, and a second adhesive layer is arranged on the layer 2.2, wherein both adhesive layers are facing the removal device 12. According to one embodiment, the layers are laminated together.

Figure 4:
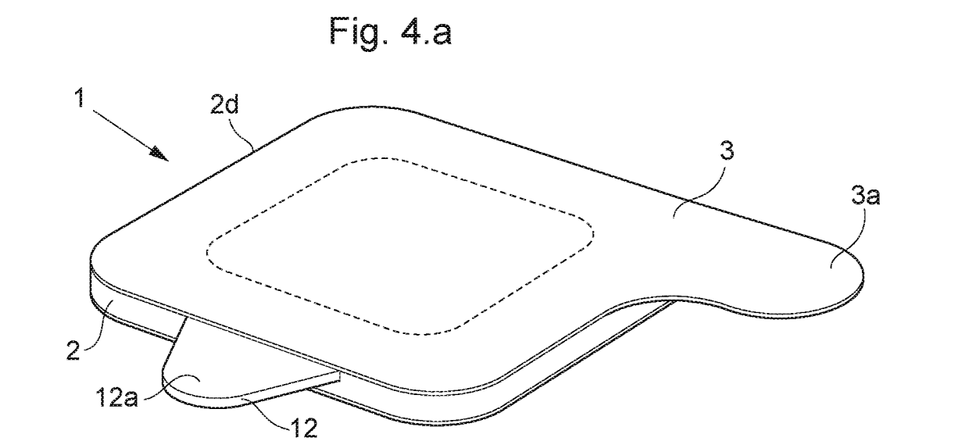
FIGS. 4a-4e shows perspective views of a device for surface sampling according to various embodiments of the invention.

FIG. 4a discloses a perspective view of the present invention according to one embodiment. Herein a protective layer 3 is arranged on the surface portion 2c of the material layer 2. According to the embodiment herein, a portion 3a of the protective layer 3 extends beyond the boundary of the surface portion 2c for facilitating removal of the protective layer 3 from the material layer 2. According to one embodiment, disclosed herein, the removal device 12 comprises a bulge of the surface portion 2c. According to one embodiment, as seen herein, the removal device 12 extends in a direction perpendicular to the portion 3a. According to one embodiment, the removal device 12 comprises a bulge of the boundary of the surface portion 2c. According to one embodiment, if the device 1 has a square or rectangular shape, the removal device 12 extends in a direction essentially parallel to the apex of one of the corners. This may facilitate removal of the device 1 from the surface as the pulling of the device 1 is initiated where the surface portion 2c has pointy shape. According to one embodiment, the removal device 12 extends with an angle in relation to the portion 3a that between 0° and 180°.

FIG. 4b discloses a perspective view of the present invention according to one embodiment, wherein the removal device 12 extends in a direction parallel to the portion 3a. According to one embodiment a parallel direction comprises an embodiment, wherein the removal device extends in an opposite direction in relation to the portion 3a.

FIG. 4c discloses a perspective view of the present invention according to one embodiment. In this embodiment, the removal device 12 is covered by the portion 3a of the protective layer 3. According to one embodiment, the portion 3a extends further than the removal device 12. One advantage is that it facilitates the removal of the protective layer before use as the pulling forces are essentially opposing each other at a given point. One advantage of this embodiment is that packing space requirement is reduced for the device comprising both a removal device and a portion 3a at the same time as the facilitated removal of the protective layer 3 is maintained.

FIG. 4d discloses a perspective view of the present invention according to one embodiment. In this embodiment, the removal device 12 is covered by the portion 3a of the protective layer, and the portion 3a extends further than the removal device 12 in a direction along or parallel to the circumferential edge portion 2d. According to one embodiment, the portion 3a extends further than the removal device 12. According to one embodiment, the portion 3a is arranged at a corner of the device 1. According to one embodiment, the removal device 12 is arranged between the corner of the device 1 and the center point between two corners of the circumferential edge 2d. According to one embodiment, the removal device 12 and removal surface portion 12a comprises at least a portion of layer 13 arranged intermediate the adhesive 4 and the material layer 4 similar to what is described with respect to FIG. 2b. As described herein, according to one embodiment, the removal surface portion 12a is provided with a protective sheet layer 12a' covering a portion of the adhesive 4 on the surface portion 2c. According to one embodiment, the further removal surface portion 12b is provided with a further protective sheet layer 12b' covering a portion of the adhesive 4' between the layer 13 and the material layer 2.

FIG. 4e discloses a perspective view of the present invention according to one embodiment, wherein the portion 3a extends further than the removal device 12 and wherein the portion 3a and the removal device are parallel but offset, i.e. there is no overlap or covering of the removal device 12. According to one embodiment, the portion 3a partly covers the removal device 12. According to this embodiment, the advantage of a reduced packing space is maintained wherein the further advantage of a facilitated removal is present as well, both described above.

Using the device 1 for surface sampling, may be carried out according to the following steps. A user looks for a suitable surface 15 on which the test can be made. The surface 15 can for instance be horizontal, vertical, slanted or somewhat concave. The user removes the protective layer 3 by grasping the portion 3a or the gripping device 5, 6 and pulling it off the material layer 2. According to one embodiment, the filler device 2b is thereby automatically removed from the sampling volume 2a. In other embodiments, the filler device 2b is removed by hand/manually. The device 1 is thereafter pressed with the exposed surface portion 2c having adhesive 4 onto a selected test surface. The device 1 is fixed on the surface by firmly pressing with the finger tips onto the device 1. A syringe (now shown) is thereafter filled with e.g. approx. 1-2 ml of washing/extracting liquid determined by the final analysis that is to be performed. The washing/extracting liquid is thereafter injected into the sampling volume 2a by piercing the syringe needle through the body of the device 1 into the sampling volume 2a of the device 1 and injecting the content of the syringe. If necessary, the needle can be bent to get a convenient angle. Thereafter, a part of the liquid is sucked out from the sampling volume 2a and reintroduced into the sampling volume 2a while maintaining the needle inserted. This will produce turbulence which improves the dissolution of the contaminants, particles and substances. This may be repeated a number of times or alternatively, the device 1 may be carefully rubbed especially when the sample is bound in a thick layer of contaminants. Finally, according to one embodiment and procedure as much as possible of the content in the sampling volume 2a is sucked out and retrieved and transferred to a cylinder (not shown) for further analysis. For even higher accuracy, the injection and turbulence creation parts may be carried out repeatedly. After use, the device 1 needs to be removed from the surface. The user grasps the removal device 12 and pulls the removal device 12 and device 1 in order to overcome the adhesive forces and remove the device 1. According to one embodiment, the user pulls the removal device in a direction perpendicular to the surface, i.e. parallel to the normal direction of the surface, According to one embodiment, the user pulls the removal device in a direction having an angle to the surface, i.e. wherein this direction is non-perpendicular to the surface 15. Preferably, a slow and controlled movement is used to prevent residuals of the device on the surface.

According to one embodiment, the lower adhesion is caused by lower adhesive forces between the removal surface portion and the surface, i.e. test surface for sampling. According to one embodiment, the lower adhesive forces are provided by lower adsorption and/or dispersive adhesion, caused by factors including but not limited to lower electrostatic van der Waals forces between molecules on the removal surface portion 12a and molecules on the test surface. According to one embodiment, the lower adhesive forces are provided by reduced diffusion, or diffusive adhesion between the removal surface portion and the surface. According to one embodiment, the lower adhesive forces are provided by reduced chemical adhesion between the removal surface portion 12a and the surface. In one embodiment the lower adhesive forces are provided by any combination of two or more of the above mentioned factors. According to one embodiment, the removal surface portion 12a is provided with an adhesive which provides a weaker adhesion on the surface than the adhesive 4 of the surface portion 2c. This enhances the ability to grasping the removal device 12. According to one embodiment, the removal surface portion 12a is a non-adhesive portion. According to one embodiment, the non-adhesive portion is provided by the protective sheet layer 12a', 12b'. In one embodiment, the removal surface portion 12a lacks an adhesive layer which provides the lower adhesion compared to the adhesive 4. According to one embodiment, the further removal surface portion 12b lacks an adhesive layer. According to one embodiment, lower adhesion of the removal surface portion 12a, is carried out by applying a solvent on the adhesive 4 prior to applying the protective layer 3. According to one embodiment, lower adhesion of the removal surface portion 12a, is carried out by applying an adhesive removing solvent or an adhesive protective compound or chemicals or other kinds of treatment such as e.g. temperature, UV etc. This may cause the strength of the adhesive forces of the adhesive against a surface to be reduced or even entirely removing the adhesive 4.

According to one embodiment, the lower adhesion provides that the removal force, $RF_{RSP}$, or peel adhesion, required to remove the removal surface portion 12a from the surface is $RF_{RSP} \leq 0.9 * RF_{ADH}$, wherein $RF_{ADH}$ is the removal force, or peel adhesion, required to remove the surface portion 2c carrying adhesive (4). According to one embodiment, $RF_{RSP} \leq 0.75 \cdot RF_{ADH}$. According to one embodiment, $RF_{RSP} \leq 0.5 \cdot RF_{ADH}$. According to one embodiment, $RF_{RSP} \leq 0.25 \cdot RF_{ADH}$. According to one embodiment, $RF_{RSP} \leq 0.1 \cdot RF_{ADH}$.

According to one embodiment, the surface 15 is a test surface for the device for surface sampling. According to one embodiment, the surface is a steel surface. According to one embodiment, the surface is a blasted steel surface, steel plate surface or steel sheet surface.

According to one embodiment, the layer 13 and layer 14 are made of a material having a higher cohesion than the material layer 2. According to one embodiment, the layers are thereby less susceptible to being damaged and leaving residues of the material layer 2 or the layer 13 and 14 against a surface 15. In one embodiment, the layer 13 is a tape layer. In one embodiment, the layer 14 is a tape layer. According to one embodiment, the layer 13 is a first layer and the layer 14 is a second layer. According to one embodiment, the layer 13 is a first pull layer 13 and the layer 14 is a second pull layer 14. According to one embodiment, the layer 13 is a first tape layer 13 and the layer 14 is a second tape layer 14. According to one embodiment, the layer 13 is a first layer 13 and the layer 14 is a second layer 14 when the layers are both provided in the same device 1. According to one embodiment, the material layer 2 is a foam layer. According to one embodiment, the separate layers 2.1, 2.2, 2.3 are separate foam layers.

According to one embodiment, the film layer 9 is shaped to cover and being arranged to the removal device 12, by extending over and covering the further removal surface portion 12b and being arranged to the same. According to this embodiment, the removal device 12 becomes even more rigid.

According to one embodiment, the device 1 is adapted to have a larger tensile strength in a first direction than in a second direction. According to one embodiment, the larger tensile strength in one direction enables a better ability to withstand higher pulling forces acting on the removal device 12 without breaking, whereas the lower tensile strength in the second direction enables a relatively more flexible material against the test surface. The latter enables a better ability to stick and seal to an uneven or rough test surface. According to one embodiment, the material layer 2 is adapted to have a larger tensile strength in a first direction than in a second direction. According to one embodiment, the first direction is perpendicular to the second direction. According to one embodiment, the first direction is parallel to the extension direction of the removal device 12. According to one embodiment, the first direction extends at an angle between 0-90° in relation to the second direction. According to one embodiment, the first direction is perpendicular to the extension direction of the removal device.

According to one embodiment, the device 1 is configured to be attached to a surface 15 by removal of the protective layer 3 to expose the adhesive layer 4 prior to attachment.

According to one embodiment, the device 1 is configured to be attached to a surface 15 by removal of the protective layer 3 to expose the adhesive layer 4 prior to attachment to the surface 15.

According to one embodiment, the device 1 is configured to receive washing/extraction liquid in the sampling volume 2a during attachment to the surface 15.

According to one embodiment, a device 1 for surface sampling is provided, comprising:
a material layer 2 comprising a surface portion 2c and a circumferential edge portion 2d defining the boundary of the surface portion 2c, further comprising a sampling volume 2a, wherein the sampling volume 2a is adapted to comprise a filler device 2b for filling out the sampling volume 2a,
a protective layer 3 arranged on the surface portion 2c of the material layer 2 by an adhesive 4 arranged on the surface portion 2c of the material layer 2,
wherein the device 1 is configured to be attached to a surface 15 by removal of the protective layer 3 to expose the adhesive layer 4 prior to attachment, wherein the device 1 is further configured to receive washing/extraction liquid in the sampling volume 2a during attachment to the surface 15 characterized in that the device 1 further comprises a removal device 12, wherein the removal device 12 is fixedly arranged to the material layer 2, wherein the removal device 12 further comprising a removal surface portion 12a, wherein the removal surface portion 12a is adapted to provide a lower adhesion against a surface compared to the adhesive 4, wherein the removal surface portion 12a is facing essentially the same direction as the surface portion 2c.

A preferred embodiment of a device for surface sampling with a removal device according to the invention has been described. However, the person skilled in the art realizes that this can be varied within the scope of the appended claims without departing from the inventive idea.

All the described alternative embodiments above or parts of an embodiment can be freely combined without departing from the inventive idea as long as the combination is not contradictory.

The invention claimed is:

1. Device for surface sampling, comprising:
a material layer comprising a surface portion and a circumferential edge portion defining a boundary of the surface portion, further comprising a sampling volume, wherein the sampling volume is adapted to comprise a filler device for filling out the sampling volume,
a protective layer arranged on the surface portion of the material layer by the adhesive layer arranged on the surface portion of the material layer, wherein the device is configured to be attached to a surface by removal of the protective layer to expose the adhesive layer prior to attachment, wherein the device is configured to receive washing/extraction liquid in the sampling volume during attachment to the surface,
wherein the device further comprises a removal device, wherein the removal device is fixedly arranged to the material layer, wherein the removal device further comprises a removal surface portion, wherein the removal surface portion is adapted to provide a lower adhesion against the surface compared to the adhesive layer, wherein the removal surface portion is facing essentially the same direction as the surface portion, wherein a layer is arranged intermediate the adhesive layer and the material layer, wherein the layer is made of a material having a higher cohesion than the material layer.

2. Device according to claim 1, wherein the removal device is integrated with the material layer.

3. Device according to claim 1, wherein the removal device comprises at least a portion of the layer arranged intermediate the adhesive layer and the material layer, wherein the layer is arranged to the material layer by a another adhesive layer.

4. Device according to claim 1, wherein the material layer comprises a plurality of separate layers.

5. Device according to claim 4, wherein the removal device is integrated with at least one of the plurality of separate layers.

6. Device according to claim 1, wherein a protective sheet layer is arranged on the removal surface portion covering a portion of the adhesive layer on the surface portion.

7. Device according to claim 1, wherein the removal device comprises a further removal surface portion, wherein the further removal surface portion is facing an opposite direction in relation to the surface portion.

8. Device according to claim 1 wherein the removal device extends beyond the boundary of the surface portion.

9. Device according to claim 1, wherein the removal device comprises a bulge of the surface portion.

10. Device according to claim 1, wherein a portion of the protective layer extends beyond the boundary of the surface portion for facilitating a removal of the protective layer from the material layer.

11. Device according to claim 10, wherein the removal device extends in a direction parallel to the portion.

12. Device according to claim 11, wherein the removal device is covered by the portion of the protective layer, wherein the portion extends further than the removal device.

13. Device according to claim 10, wherein the removal device extends in a direction perpendicular to the portion.

14. The device according to claim 1, wherein the material layer is flat.

* * * * *